Nov. 26, 1940.    M. HEBEL    2,222,905
METERING DEVICE
Filed July 28, 1936    3 Sheets-Sheet 1
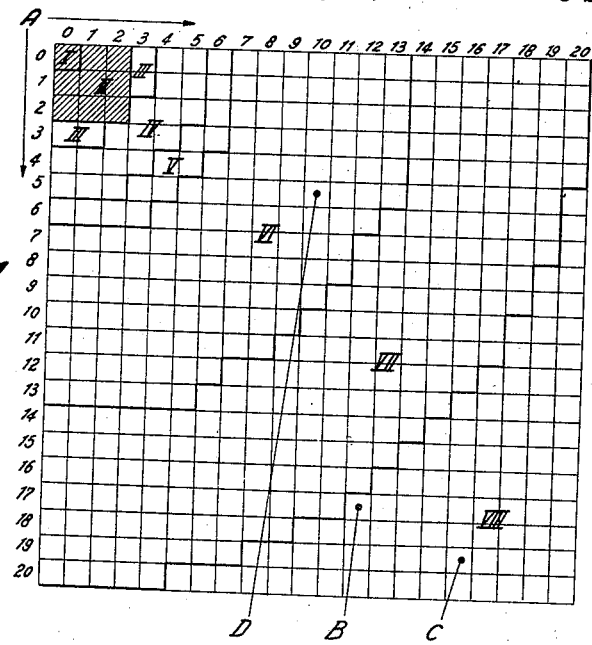
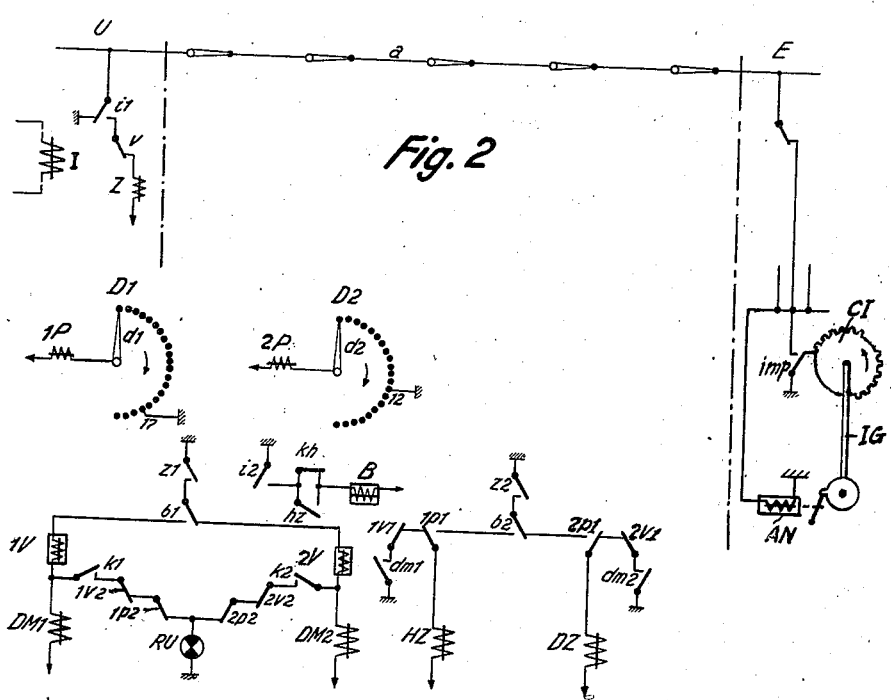
Martin Hebel
by
Gill & Jennings
Attorney Nov. 26, 1940.　　　　M. HEBEL　　　　2,222,905
METERING DEVICE
Filed July 28, 1936　　　3 Sheets-Sheet 2

Martin Hebel
by Gill + Jennings
Attorneys

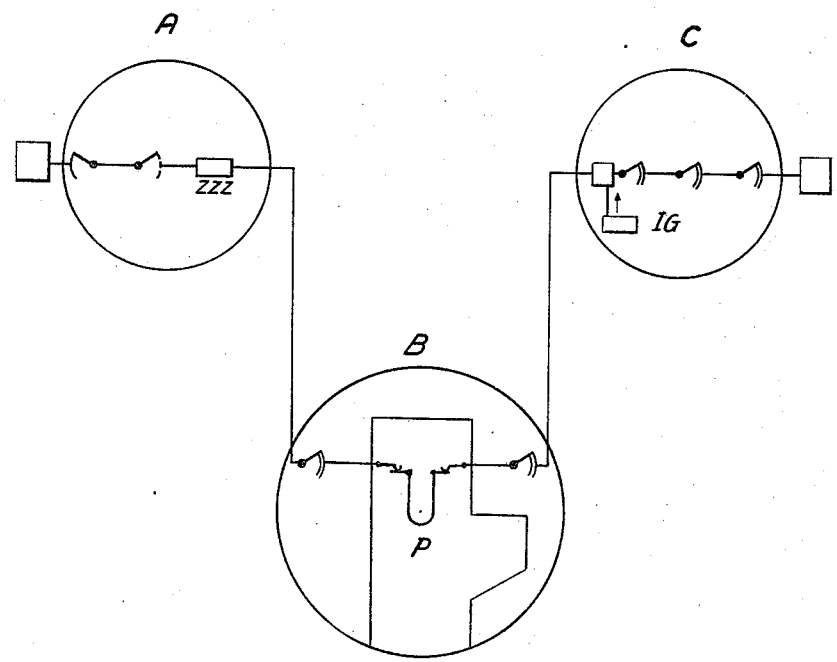

Patented Nov. 26, 1940

2,222,905

UNITED STATES PATENT OFFICE 2,222,905

METERING DEVICE

Martin Hebel, Oberbayern, Germany

Application July 28, 1936, Serial No. 93,036
In Germany November 13, 1935

11 Claims. (Cl. 179—7.1)

It is usual to assess the charge to be made for communications, such as telephone communications, between subscribers belonging to different exchanges on the basis of the distance between the exchanges. The charge may also be a function of the time during which the subscribers are in communication with each other.

The charge is usually the same for all distances lying within certain limits. Thus, scale I may be effective for all communications between exchanges separated from each other by distances not exceeding 10 miles, scale II for distances between 10 and 20 miles, scale III for distances between 20 and 30 miles and so on. This can be expressed in another way. Thus, it may be said that an exchange lying within 10 miles of another exchange belongs to zone I relatively to the latter exchange or a communication between the said exchanges has a zone value of I relatively thereto; that an exchange lying at a distance of from 10 to 20 miles from another exchange belongs to zone II relatively to the latter exchange or a communication between the said exchanges has a zone value of II relatively thereto.

In manually operated exchanges a map of the area within which all accessible exchanges lie is sometimes provided, which map is divided up in accordance with a two-dimensional co-ordinate system. To find the charge scale appropriate to an exchange to which a connection is made or the zone value of the connection, the ordinate and abscissa of the terminal exchange are measured taking the originating exchange as the datum or zero point and the necessary calculation is made therefrom. Alternatively, the ordinates and abscissae of the two exchanges are measured and their difference evaluated.

The principal object of the invention is to provide a system in which the zone value of a connection between two exchanges is evaluated automatically.

An example of a method of achieving that object is illustrated in the accompanying drawings.

Figure 1 illustrates the known co-ordinate system of representing the relative locations of a number of exchanges.

Figure 2 shows a circuit diagram for the transmission of a characteristic charge signal from a terminal exchange to an originating exchange and the devices at the originating exchange for using the received signal to operate a zone determining device.

Figure 5 illustrates the fundamental construction of a hand-operated exchange system.

Figure 3:
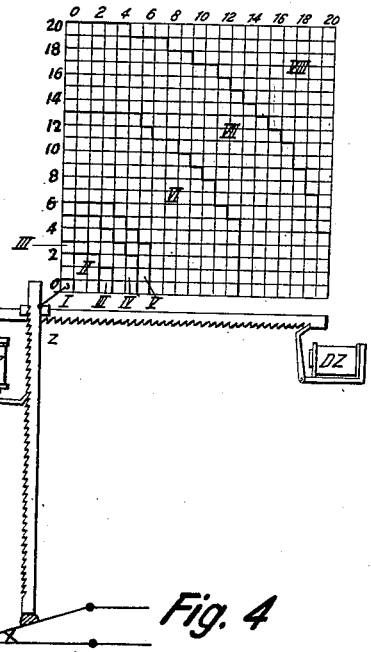
Figure 3 illustrates the fundamental idea underlying the construction of a zone determining device.

The large square shown in Figure 1 is divided up into a number of smaller squares of like size and the horizontal and vertical rows of small squares are numbered. The numbers serve to identify the position of any small square, that is to say, any of the small squares considered as a point or a unit can be located by reference to its rectangular co-ordinates. These co-ordinates can be used as a measure of the distance between two squares and it is clear that the distance from the square D (5/10) to the square C (19/16) is the same as that from the square 0/0 to the square 14/6. If the large square is considered to represent a geographical area containing exchanges A, B, C, D between which calls can be made at a charge depending on the distance between the connected exchanges, it will be seen that the charge appropriate to a call from exchange D to exchange C will be the same as that appropriate to a call from exchange A to an exchange in the square 14/6; that the charge appropriate to a call from exchange B (17/12) to exchange D (5/10) will be the same as that appropriate to a call from exchange A to an exchange situated in the square 12/2. The heavy lines in Figure 1 indicate the limits of the zones in which exchanges must lie if the charge for calls from the exchange A to them is to be the same. These zones are numbered I–VIII. A call from exchange A to an exchange in zone I is charged for according to scale I; a call from exchange A to an exchange in zone III is charged for according to scale III and so on. A call from exchange D to exchange C will be charged for according to scale VII because the square 14/6 lies in zone VII and a call from B to D will be charged for according to scale VI because the square 12/2 lies in zone VI.

In general terms, the scale according to which any call is to be charged is that appropriate to the zone in which lies the square identified by the co-ordinates obtained from the difference between the respective co-ordinates of the connected exchanges.

If now, each of the squares in Figure 1 is imagined to be an electrical contact, to indicate the charge scale appropriate to a particular call, it is only necessary to cause a switch arm normally located on the contact in square 0/0 to be moved over the contacts first in one direction and then in the direction at right angles to the first by amounts corresponding to the differences between the respective co-ordinates of the connected exchanges. This, in effect, is what is done by means of the apparatus now to be described.

Each exchange has a transmitter which, on the exchange being connected to another exchange, transmits thereto two series or groups of current impulses, the number of impulses in these groups being the co-ordinates in the scheme outlined in Figure 1 of the square in which the exchange is situated. Thus, if a call is made from exchange B to exchange C, the transmitter at the latter exchange transmits back a first group of 19 impulses and a second group of 16 impulses; if a call is made from A to D, the transmitter at D transmits to A a first group of 5 impulses and a second group of 10 impulses.

Figure 2 shows the connections between an exchange U (originating exchange) making a call to an exchange E (terminal exchange). The impulse transmitter in the terminal exchange is shown at IG. It comprises a cam CI which is driven by a motor (not shown) and intermittently closes and opens an impulse contact $imp$. A magnet AN is also provided in the terminal exchange which, on being energised, causes the impulse transmitter to operate. This impulse transmitting device is connected to one speech wire $a$ in the line connecting the originating exchange U to the terminal exchange E. If the speech lines are subdivided by transformers into individual sections, devices for repetition of the impulses in the neighbouring section must be provided. Such circuit arrangements are known. A direct metallic through switching of the original exchange to the final exchange can be assumed.

A relay Z can be connected to this wire of the speech line, by means of a contact $i1$ of a relay I in the originating exchange. In this way, the speech wire is connected to the source of current and causes the magnet AN in the terminal exchange E to be energised and the impulse transmitter to be operated. The relay Z does not pull up when connected in series with the magnet AN. When the impulse transmitter is operated, the magnet AN is short circuited by the contact $imp$. The relay Z is then actuated.

The throwing of the contact $i1$ by the relay I thus determines the instant of time at which the impulse transmitter in the terminal exchange is to come into operation. This can be effected, for example, when the calling subscriber hangs up his receiver. In this case, a holding circuit for the connection devices can be closed at the same time so that the connection is not cut off until the end of the metering procedure.

In the originating exchange U two rotary selectors D1 and D2 which can be stepped by the magnets DM1 and DM2 are provided for determining the differences between the co-ordinates of the two exchanges as will be explained later.

When the relay I is actuated, the contact $i1$ is thrown and the impulse transmitter IG of the terminal exchange is actuated. The contact $i2$ is also thrown so that a relay B is energised and, through its contact $b1$, prepares the setting circuit for the selector D1. The impulses transmitted by the impulse transmitter IG of the terminal exchange through the contact $imp$ are received by the relay Z and are repeated by the contact $z1$. It will be assumed that the co-ordinates of the originating exchange are 17/12 and those of the terminal exchange 19/16. The 17th contact of the contact bank of the selector D1 is permanently connected to earth, as is the 12th contact of the contact bank of the selector D2. The wiring of the contact bank of the selectors D1 and D2 of each exchange corresponds to the co-ordinates of each exchange and is, of course, different for the various exchanges.

The impulse transmitter of the terminal exchange now first of all sends out impulses corresponding to the ordinate 19 of this exchange. At each current impulse, the following stepping circuit is closed:

+, contacts $z1$, $b1$, relay 1V, stepping magnet DM1, —

The relay 1V pulls up at the first current impulse, interrupts the stepping circuit for the magnet HZ of the zone determining device by means of its contact $1v1$ and interrupts an automatic stepping circuit for the stepping magnet DM1 by means of its contact $1v2$. The switch arm $d1$ of the selector D1 is stepped out of its normal position through nineteen steps. At the 17th step, the switch arm reaches an earthed contact and the relay 1P pulls up so that its contact $1p1$ closes the following stepping circuit for the magnet HZ:

+, contacts $z2$, $b2$, $1p1$, magnet HZ, —

The next two current impulses for the 18th and 19th steps of the selector D1 are now transmitted by means of the contact $z2$ also to the magnet HZ so that this magnet HZ is acted on by a number of current impulses which corresponds to the difference between the ordinates of the terminal and originating exchanges. A contact $kh$ is mechanically connected to the switch arm $d1$ so that it remains closed as long as the arm $d1$ remains in its normal position. As soon as the arm $d1$ moves out of its normal position under the influence of the magnet HZ, the contact $kh$ is opened but the relay B remains nevertheless energised because the contact $hz$ is closed by the magnet HZ.

After the transmission of this train of current impulses, the relay Z remains dropped for some time. Consequently, the slow-to-release relay 1V drops. As the contact $hz$ is opened, the relay B also drops and prepares a circuit for the selector D2 by means of its contact $b1$.

When the train of current impulses corresponding to the abscissa value of the terminal exchange is sent out, the selector D2 is stepped in the circuit:

+, contacts $z1$, $b1$, relay 2V, magnet DM2, —

The relay 2V responds at the first current impulse and, by means of its contact $2v1$, interrupts a stepping circuit for the magnet DZ of the zone determining device. The switch arm $d2$ of the selector D2 is now stepped through sixteen steps corresponding to the abscissa 16. At the 12th step, the arm $d2$ reaches an earthed contact and the relay 2P pulls up and closes the stepping circuit for the magnet DZ of the zone determining device with its contact $2p1$. The magnet DZ will now be influenced by means of the remaining four current impulses through the contact z2. Thus, a number of current impulses acts on the magnet DZ which corresponds to the difference between the abscissae of the terminal and originating exchanges.

The case will now be considered in which both the co-ordinates of the terminal exchange are smaller than those of the originating exchange. It will be assumed that the co-ordinates of the terminal exchange are 5/10 and those of the originating exchange as before, viz. 17/12. When the selector D1 is stepped under the influence of five current impulses corresponding to the ordinate of the terminal exchange, the switch arm $d1$ will arrive at the 5th contact and will not reach the earthed contact. However, after transmission of this train of five current impulses, the relay IV drops and the following automatic stepping circuit for the selector D1 is closed:

+, interrupter RU, contacts $1p2$, $1v2$, $k1$, magnet DM1, —

The contact $k1$ was mechanically closed when the selector left its normal position. The switch arm $d1$ of the selector is now stepped in this circuit until it arrives at the earthed contact 17. The relay 1P is then energised and interrupts the stepping circuit by means of its contact $1p2$.

Simultaneously with the closing of the stepping circuit for the selector D1 on release of the relay 1V, a stepping circuit is also closed at the contact $1v1$ for the magnet HZ of the zone determining device which is controlled by a contact $dm1$ actuated by the armature of the magnet DM1. The magnet HZ thus receives as many current impulses as the selector D1 makes switching steps under the influence of the automatic stepping circuit, that is to say, in the present example, 12 current impulses.

When the magnet HZ is no longer acted on, the relay B drops and prepares a circuit for the stepping magnet DM2. If the ten current impulses corresponding to the abscissa of the terminal exchange are now transmitted, the selector D2 is then operated so that its arm $d2$ arrives at the contact 10. The relay 2V now drops and closes an automatic stepping circuit for the magnet DM2 at its contact $2v2$ and prepares a setting circuit for the magnet DZ of the zone determining device at its contact $2v1$. The stepping magnet DM2 is twice energised in this automatic stepping circuit and, at each energisation, closes the setting circuit for the magnet DZ at its contact $dm2$. The second energisation brings the switch arm $d2$ to the earthed contact 12, the relay 2P pulls up, interrupts the automatic stepping circuit by opening the contact $2p2$ and thus brings the selector D2 to rest. Thus, the zone determining device is again set in accordance with the difference between the ordinates and the abscissae of the originating and terminal exchanges. The setting always takes place in the same sense irrespective of whether these differences are positive or negative.

After the setting of the zone determining device, the selectors D1 and D2 can be switched back into the normal position in a manner known in itself and which need not be described in greater detail.

It is clear that an additional length of time is necessary for the automatic stepping of the selectors D1 and D2 where the difference between the co-ordinates of the exchanges is negative. This extra time can be positively ensured by interrupting for this time in the originating exchange the starting circuit for the impulse repeater of the terminal exchange. It is also possible, however, for provision to be made for transmitting the train of current impulses corresponding to the abscissa of the terminal exchange during the automatic stepping of the selector D1, the magnet HZ thus still being influenced. In this case, the movements produced by the magnets HZ and DZ of the zone determining device must be mechanically independent of each other.

The magnets HZ and DZ cause a switch arm to be moved in two different directions. In the form of construction of zone determining device illustrated diagrammatically in Figure 3, the movement of the switch arm $z$ is compounded of two rectilinear movements, the switch arm moving over a plane contact bank. This contact bank is provided with contacts corresponding to the various small squares of the charge system of Figure 1. As a number of these contacts have the same zone value, a solid metal plate subdivided at the boundaries between the individual zone values by insulating strips can advantageously be used to form the contact bank. Only the contact arm $z$ in this case is pressed against this disc-shaped contact bank and is displaced over it in the two setting directions.

If the magnet HZ is acted upon by two current impulses corresponding to a differential amount of 2 and the magnet DZ by four current impulses corresponding to a differential amount of 4, the switch arm $z$ would arrive at the square 2/4 of the contact bank, i. e., within the zone IV. In the same way, with a difference of 12/2, the switch arm $z$ would be set to a square within the zone VI. Any type of selector which can be set in two directions, a Strowger selector for example, can be used as a zone determining device. A number of simple rotary switches together forming a selector could also be used. In view of wiring requirements, it is important, however, that selectors with individual contacts should not be used but only selectors having solid contact plates which are subdivided into various zone rings by means of insulating strips. This has the advantage that the zone plates of all the zone determining devices are constructed similarly to each other irrespectively of the exchange in which they are to be used. By expressing the characteristic charge figures in terms of their co-ordinates a distance factor appropriate to all connections made between two exchanges is fixed once and for all.

The co-ordinate charge system can be applied to territories of all sizes. If the territory is subdivided so that there are more than 20 adjacent squares, the selectors D1 and D2 are advantageously set in large and small steps by several trains of current impulses. Large and small switch steps in either direction can also be used if desired for setting the zone determining device but the devices are then more complicated.

Figure 4:
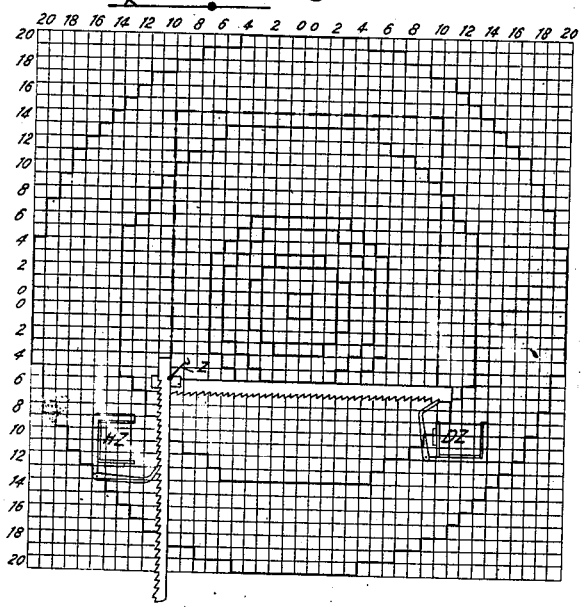
Figure 4 illustrates the idea underlying a further form of construction of a zone determining device which establishes the differences between co-ordinates directly.

In the example illustrated in Figure 4, there is a contact plate subdivided into individual zone rings which is constructed in the same way as the contact plate of the zone selector illustrated in Figure 3 but is enlarged symmetrically about the axes of the co-ordinates so that the datum point lies at the centre of the contact plate. In its normal position, the switch arm of a zone selector lies on a square which is determined by the co-ordinates of the exchange to which the selector belongs. The switch arm is in this case displaced relatively to the datum point of the contact plate in accordance with the charge figure of the exchange associated with it.

If now the zone selector is acted upon by the current impulses corresponding to a particular set of co-ordinates, its switch arm is brought positively at the end of the setting movement on to a square of the contact plate, the position of which relatively to the datum point is determined by the difference in the co-ordinates of the two exchanges.

If the zone selector is constructed in this way, special selectors for determining the difference between the co-ordinates are unnecessary because the differentiation is effected automatically in the zone selector by the permanent setting of the normal position of the switch arm relatively to the datum point. The contact plates can be the same for all the zone selectors of the various exchanges. It is only the position of the movable switch arms relatively to their plates which is different in the zone selectors of the various exchanges because the normal position of each switch arm is determined by co-ordinates of the exchange to which it belongs. Obviously, parts of a contact plate can be omitted according to the disposition of the normal position of the switch arm relatively to the contact plate so as to save space as there is a maximum distance through which the switch arm ever has to be moved in any direction. The boundary of a contact plate reduced in size in this manner is indicated by dotted lines in Figure 4.

This form of construction of the zone selector makes it possible for both the ordinates and the abscissae to be transmitted in the form of two trains of current impulses by means of which the switch arm is displaced in large and small steps. As the switch arm is always stepped from its normal position, this displacement in large and small steps is possible without difficulty. For this purpose, stepping devices known in themselves providing for electromagnetic stepping or for the electromagnetic production of a stepping movement under the influence of a stored force can be used.

The described arrangement for determining the zone value of or charge scale appropriate to a telephone connection are only dependent upon the emission of two groups or series current impulses from the terminal exchange to the originating exchange the number of impulses in each group being determined once and for all and being characteristic of the terminal exchange. These devices are also capable of being used in hand operated telephone exchanges, that is to say, in exchanges in which the automatic zone determining instruments of the known time-zone selectors cannot be used. If, indeed, a connection is made to another exchange established over any particular route, the metering device of the originating exchange of which the zone determining device described herein is a part always receives the characteristic signal current impulses of the terminal exchange by which the correct zone is determined. By means of the arrangement illustrated in Figure 5, a subscriber of the exchange A can, for example, call the operator of the exchange B which may be 30 miles away. The operator can then connect the subscriber with a subscriber of the automatic exchange C by means of her set P, the exchange C being 70 miles from the exchange B and 90 miles from the exchange A. Thus, the operator immediately calls the desired subscriber and the two parts of the connection are connected up without referring back to the exchange A or calling upon a special supervising operator to determine that the calling subscriber belongs to a particular exchange. The appropriate charge for the communication can indeed be established fully by the metering device ZZZ of the originating exchange A, the same metering device ZZZ being effective both with automatic and with manual selection. If the metering device ZZZ is constructed in known manner as a time zone meter, the time counting can begin as soon as the called subscriber removes his receiver. When the calling subscriber hangs up, the characteristic charge signal impulses of the called subscriber's exchange C are transmitted to the metering device ZZZ of the originating exchange A by means of the impulse transmitter IG of the exchange C, the current impulses being transmitted through the exchange B. On reception of these current impulses, the metering device ZZZ of the originating exchange A can automatically break the connection between the exchange B and the terminal exchange C or give the disconnecting signal to the operator so that the latter cuts the outgoing connection. In the meantime, the metering device ZZZ can transmit the appropriate charge signal by means of current impulses to the calling subscriber's meter. The use of the new zone determining device thus simplifies the supervising duties of the operator to a very considerable degree, makes special calling back and supervising elements unnecessary and simplifies the metering devices for fully automatic and semi-automatic traffic so that the organization of the semi-automatic traffic for special cases can be effected without disturbing the fundamental construction of the network for automatic traffic.

The evaluation of the determined zone value by a metering device can be effected in any known fashion. Obviously, the charge figure of the terminal exchange can also be transmitted to the originating exchange when the desired subscriber is called.

The described devices for determining the zone value of a connection are not effective during the setting up of a telephone connection. It is only after the called subscriber has removed his receiver that a device can come into operation for determining the duration of the connection if time metering is desired, while the device for determining the zone preferably comes into operation only after the end of the conversation when the calling subscriber hangs up. Consequently, one zone determining device and the devices dependent upon it for translating the zone into metering units may be provided for a number of lines. The zone-determining device and its adjuncts are only in operation for a short length of time which is always the same so that they are only connected to the line in case of need. In this way, a substantial saving is obtained because in contrast to the known arrangements, it is only necessary for a comprehensive and expensive zone and tariff instrument, to be provided for use in connection with a number of lines.

I claim:

1. A communication system comprising a plurality of exchanges, a current impulse transmitter in each of said exchanges, means in each exchange automatically operative on said exchange being called and connected to another exchange to cause said impulse transmitter at the called exchange to transmit to the calling exchange two groups of impulses corresponding to the co-ordinates of the called exchange in a two-dimensional co-ordinate system, means in each exchange for indicating the zone value of connections made from it and means in each exchange automatically operated on reception of said groups of impulses whereby to cause said indicating means to be acted upon by two groups of current impulses corresponding in number to the differences between the co-ordinates of the called exchange and the corresponding co-ordinates of the calling exchange in the said co-ordinate system.

2. A communication system comprising an originating exchange and a terminal exchange, said terminal exchange having associated with it a current impulse transmitter adapted on connection being made from said originating exchange to said terminal exchange to transmit two groups of current impulses which are characteristic of said exchange and are a measure of the co-ordinates of a point which indicates the position of said terminal exchange in a two-dimensional co-ordinate system representing the relative positions of a number of exchanges, a device for determining the zone value of the connection between said exchanges adapted, under the influence of the impulses transmitted from said terminal exchange, to be set in a position indicative of the location of a point in said co-ordinate system, the co-ordinates of which are determined by the differences between the respective co-ordinates of said terminal exchange and of said originating exchange and indicative of the zone in said co-ordinate system in which said terminal exchange is situated relatively to said originating exchange.

3. A system as claimed in claim 2, in which said zone determining device comprises a contact bank, the contacts of which represent regularly spaced points in said two-dimensional co-ordinate system and a switch arm adapted to be stepped over said contact bank under the influence of said current impulses from said terminal exchange and thus complete a circuit characteristic of the zone value.

4. A communication system comprising a plurality of exchanges, a current impulse transmitter at each of said exchanges adapted to transmit two groups of impulses to an exchange from which connection is made to the exchange in which it is provided, two selectors at each of said exchanges each comprising a contact bank over which said selectors are set one by the one and the other by the other of said groups of impulses, the number of impulses in said groups of impulses being respectively a measure of the co-ordinates determining the position of the exchange in which said impulse transmitter is provided in a two-dimensional co-ordinate system embracing the whole of said exchanges and each of said contact banks comprising an earthed contact on to which the associated selector is set on reception of a number of impulses corresponding to one of the co-ordinates in said co-ordinate system of the exchange in which the selector is situated and means for evaluating and indicating on an arbitrary scale the distance between said connected exchanges from the difference in the positions of said selectors in said contact banks on being set by said groups of impulses and the positions of said earthed contacts in said contact banks.

5. A system as claimed in claim 4, in which said distance evaluating and indicating means comprise an electromagnetic stepping device associated with each of said selectors and switch means controlled by said selectors and adapted to close circuits for said stepping devices whereby said stepping devices are stepped one through a number of steps corresponding to the difference between the number of impulses in one of said received groups and the number of impulses which have to be received in order that the selector acted upon by said group may reach said earthed contact in its contact bank, and the other through a number of steps corresponding to the difference between the number of impulses in the other of said received groups and the number of impulses which have to be received in order that the selector acted upon by said other group may reach said earth contact in its contact bank.

6. A system as claimed in claim 4, in which said distance evaluating and indicating means comprise electromagnetic means adapted to be influenced by the current impulses in said groups which are received after said selectors have been stepped on to said earthed contacts.

7. A system as claimed in claim 4, comprising a stepping device for said distance evaluating and indicating means and means for automatically bringing said stepping device into operation at the conclusion of the reception of each of said groups of current impulses whereby to cause said distance evaluating and indicating means to be stepped through a number of steps equal to that through which said selectors would have to be stepped at the conclusion of the reception of said groups of selectors to arrive at said earthed contacts.

8. A system as claimed in claim 4, comprising a stepping device for said distance evaluating and indicating means, means for automatically bringing said stepping device into operation at the conclusion of the reception of each of said groups of current impulses whereby to cause said distance evaluating and indicating means to be stepped through a number of steps equal to that through which said selectors would have to be stepped at the conclusion of the reception of said groups of selectors to arrive at said earthed contacts and switch means in each exchange operative to prevent operation of said transmitter therein during the stepping of said distance evaluating and indicating means.

9. A communication system comprising a plurality of exchanges, a current impulse transmitter in each of said exchanges adapted to transmit two groups of current impulses, the numbers of impulses in each group characterising said exchanges, means for bringing said transmitter into operation on connection being made to the exchange in which said transmitter is situated from another of said exchanges, means in each exchange adapted to be influenced on reception of said groups of impulses, said means comprising a contact bank and a switch arm adapted to be stepped over said contact bank in two directions, in one direction through a number of steps equal to the difference between the number of impulses in one of said transmitted groups and the number of impulses in the corresponding group which the transmitter at the receiving exchange is adapted to transmit and in the other direction through a number of steps equal to the difference between the number of impulses in the other of said transmitted groups and the number of impulses in the group corresponding thereto which the transmitter at the receiving exchange is adapted to transmit.

10. A system as claimed in claim 9, in which said contact bank is formed as a plate of conducting material subdivided into electrically insulated sections.

11. A communication system comprising an originating exchange and a terminal exchange, in which said terminal exchange is provided with a current impulse transmitter adapted on connection being made from said originating exchange to said terminal exchange to transmit to said originating exchange two groups of impulses which are characteristic of said terminal exchange and are a measure of the co-ordinates of a point which indicates the position of said terminal exchange in a two-dimensional co-ordinate system representing the relative positions of a number of exchanges and in which said originating exchange is provided with two selectors each adapted to be set by one of said groups of impulses, with a device for determining the zone value of the connection and with means controlled by said selectors for transmitting to said device two groups of setting impulses one comprising a number of impulses equal to the difference between the number of impulses received by one of said selectors and one of the co-ordinates of the originating exchange and the other comprising a number of impulses equal to the difference between the number of impulses received by the other of said selectors and the other co-ordinate of the originating exchange.

MARTIN HEBEL.